United States Patent [19]
Hipke

[11] Patent Number: 5,406,672
[45] Date of Patent: Apr. 18, 1995

[54] WINDSHIELD WIPER SYSTEM INCLUDING WIPING AND SCRUBBING BLADES

[76] Inventor: Earl M. Hipke, 219 S. Madison St., O'Neill, Nebr. 68763

[21] Appl. No.: 235,880

[22] Filed: May 2, 1994

[51] Int. Cl.⁶ .............................................. B60S 1/38
[52] U.S. Cl. .............................. 15/250.41; 15/250.36
[58] Field of Search ........... 15/250.40, 250.41, 250.42, 15/250.36, 250.04, 250.35

[56] References Cited

U.S. PATENT DOCUMENTS

| | | | |
|---|---|---|---|
| 3,906,583 | 9/1975 | Murphy | 15/250.41 |
| 4,327,457 | 5/1982 | Lunsford | 15/250.41 |
| 4,611,364 | 9/1986 | Grubner | 15/250.41 |
| 4,649,593 | 3/1987 | Gilliam, III et al. | 15/250.41 |
| 5,168,595 | 12/1992 | Naylor, Jr. | 15/250.41 |
| 5,235,720 | 8/1993 | Kinder | 15/250.41 |
| 5,301,384 | 4/1994 | Perry | 15/250.41 |

FOREIGN PATENT DOCUMENTS 8302756 8/1983 WIPO .............................. 15/250.41

Primary Examiner—David A. Scherbel
Assistant Examiner—Gary K. Graham

[57] ABSTRACT

A windshield wiper blade system comprising an elastomeric wiper blade further comprising an elongated base portion; a coupling mechanism for coupling the base portion within a plurality of clip guides on a vehicle's windshield wiper actuating arm; and a squeegee coupled to the base portion and extended downwards therefrom to contact the surface of a windshield; and a scrubbing blade further comprising a sponge extended along and coupled to the base portion near the squeegee with the sponge having a surface adapted to conform with the surface of a windshield; and webbing disposed about the sponge and defining a scrubbing surface; whereby when the system is stroked back and forth across the surface of a windshield with the vehicle's windshield wiper actuating arm, the wiper blade and the scrubbing blade remove both water and bugs.

1 Claim, 4 Drawing Sheets

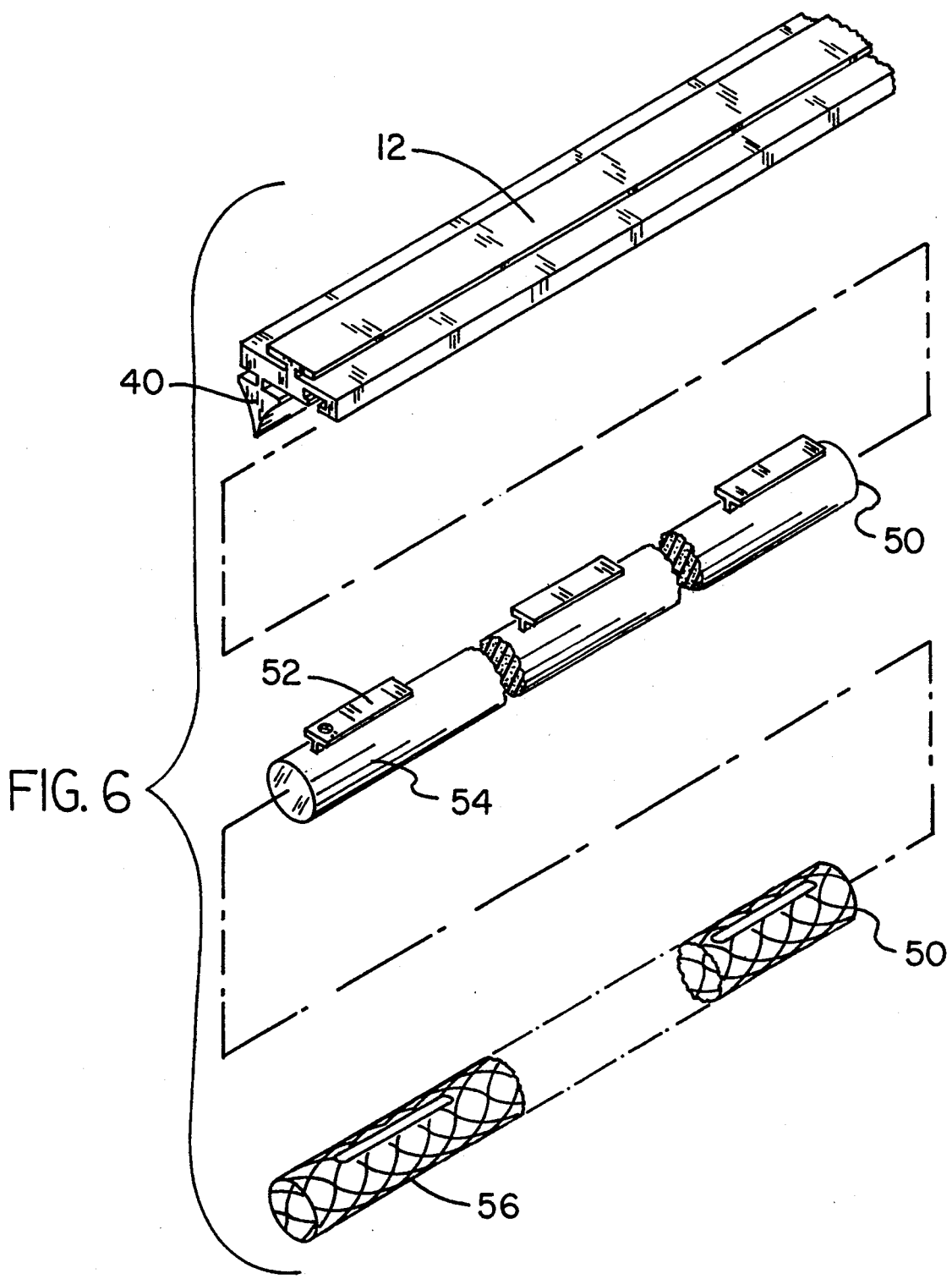

WINDSHIELD WIPER SYSTEM INCLUDING WIPING AND SCRUBBING BLADES

BACKGROUND OF THE INVENTION

1. Field of the Invention

The present invention relates to a windshield wiper blade system and more particularly pertains to cleaning bugs from a windshield of a vehicle with a windshield wiper blade system.

2. Description of the Prior Art

The use of windshield wiper blades is known in the prior art. More specifically, windshield wiper blades heretofore devised and utilized for the purpose of cleaning bugs from a windshield of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,526,918 to Leland discloses a flexible window washer and wiper. U.S. Pat. No. 3,639,938 to Golden discloses a windshield-cleaning system. U.S. Pat. No. 4,473,919 to Fritz, Jr. discloses a windshield wiper blade. U.S. Pat. No. 4,847,940 to Bradbury discloses a windshield wiper blade. U.S. Pat. No. 5,048,146 to Cavenago discloses a wiper blade.

While these devices fulfill their respective, particular objective and requirements, the aforementioned patents do not describe a windshield wiper blade system where cleaning action is performed by a sponge on a stroke of the vehicle's windshield wiper actuating arm and wiping action is performed by an elastomeric squeegee on a return stroke of the vehicle's windshield wiper actuating arm.

In this respect, the windshield wiper blade system according to the present invention substantially departs from the conventional concepts and designs of the prior art, and in doing so provides an apparatus primarily developed for the purpose of cleaning bugs from a windshield of a vehicle.

Therefore, it can be appreciated that there exists a continuing need for new and improved windshield wiper blade system which can be used for cleaning bugs from a windshield of a vehicle. In this regard, the present invention substantially fulfills this need.

SUMMARY OF THE INVENTION

In the view of the foregoing disadvantages inherent in the known types of windshield wiper blades now present in the prior art, the present invention provides an improved windshield wiper blade system. As such, the general purpose of the present invention, which will be described subsequently in greater detail, is to provide a new and improved windshield wiper blade system and method which has all the advantages of the prior art and none of the disadvantages.

To attain this, the present invention essentially comprises, in combination, an elongated elastomeric wiper blade and scrubbing blade. The wiper blade includes an elongated base portion having a top surface and a bottom surface with the bottom surface having an upwardly extended T-shaped channel formed thereon. The wiper blade includes a flexible and upwardly extended T-shaped mounting flange coupled to the top surface of the base portion with the upper extent of the flange adapted to be coupled within a plurality of clip guides on a vehicle's windshield wiper actuating arm. The wiper blade includes a flexible and downwardly extended T-shaped support flange coupled to the bottom surface of the base portion and offset from the axial extent thereof. Lastly, the wiper blade includes a squeegee having a base end coupled to the support flange and a flexible intermediate portion having opposed concave surfaces formed thereon and tapered downwards to terminate at a tip end adapted to contact the surface of a windshield. The scrubbing blade includes an elastomeric and upwardly extended T-shaped support flange having one part coupled within the channel of the base portion and another part extended therefrom. The scrubbing blade includes a cylindrical sponge coupled along the extended part of the support flange with the sponge having a surface adapted to conform with the surface of a windshield. Lastly, the scrubbing blade includes nylon webbing disposed about the cylindrical sponge and defining a scrubbing surface therearound. When the system is stroked back and forth across the surface of a windshield with the vehicle's windshield wiper actuating arm, the wiper blade and the scrubbing blade remove both water and bugs.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved windshield wiper blade system which has all the advantages of the prior art windshield wiper blades and none of the disadvantages.

It is another object of the present invention to provide a new and improved windshield wiper blade system which may be easily and efficiently manufactured and marketed.

It is a further object of the present invention to provide a new and improved windshield wiper blade system which is of durable and reliable construction.

An even further object of the present invention is to provide a new and improved windshield wiper blade system which is susceptible of a low cost of manufacture with regard to both materials and labor, and which accordingly is then susceptible of low prices of sale to the consuming public, thereby making such a windshield wiper blade system economically available to the buying public.

Still yet another object of the present invention is to provide a new and improved windshield wiper blade system which provides in the apparatuses and methods of the prior art some of the advantages thereof, while simultaneously overcoming some of the disadvantages normally associated therewith.

Even still another object of the present invention is to provide a new and improved windshield wiper blade system for cleaning bugs from a windshield of a vehicle.

Lastly, it is an object of the present invention to provide a new and improved windshield wiper blade system comprising an elastomeric wiper blade further comprising an elongated base portion; coupling means for coupling the base portion within a plurality of clip guides on a vehicle's windshield wiper actuating arm; and a squeegee coupled to the base portion and extended downwards therefrom to contact the surface of a windshield; and a scrubbing blade further comprising a sponge extended along and coupled to the base portion near the squeegee with the sponge having a surface adapted to conform with the surface of a windshield; and webbing disposed about the sponge and defining a scrubbing surface; whereby when the system is stroked back and forth across the surface of a windshield with the vehicle's windshield wiper actuating arm, the wiper blade and the scrubbing blade remove both water and bugs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an exploded perspective view of the present invention.

The same reference numerals refer to the same parts through the various Figures.

DESCRIPTION OF THE PREFERRED EMBODIMENT

Figure 1:
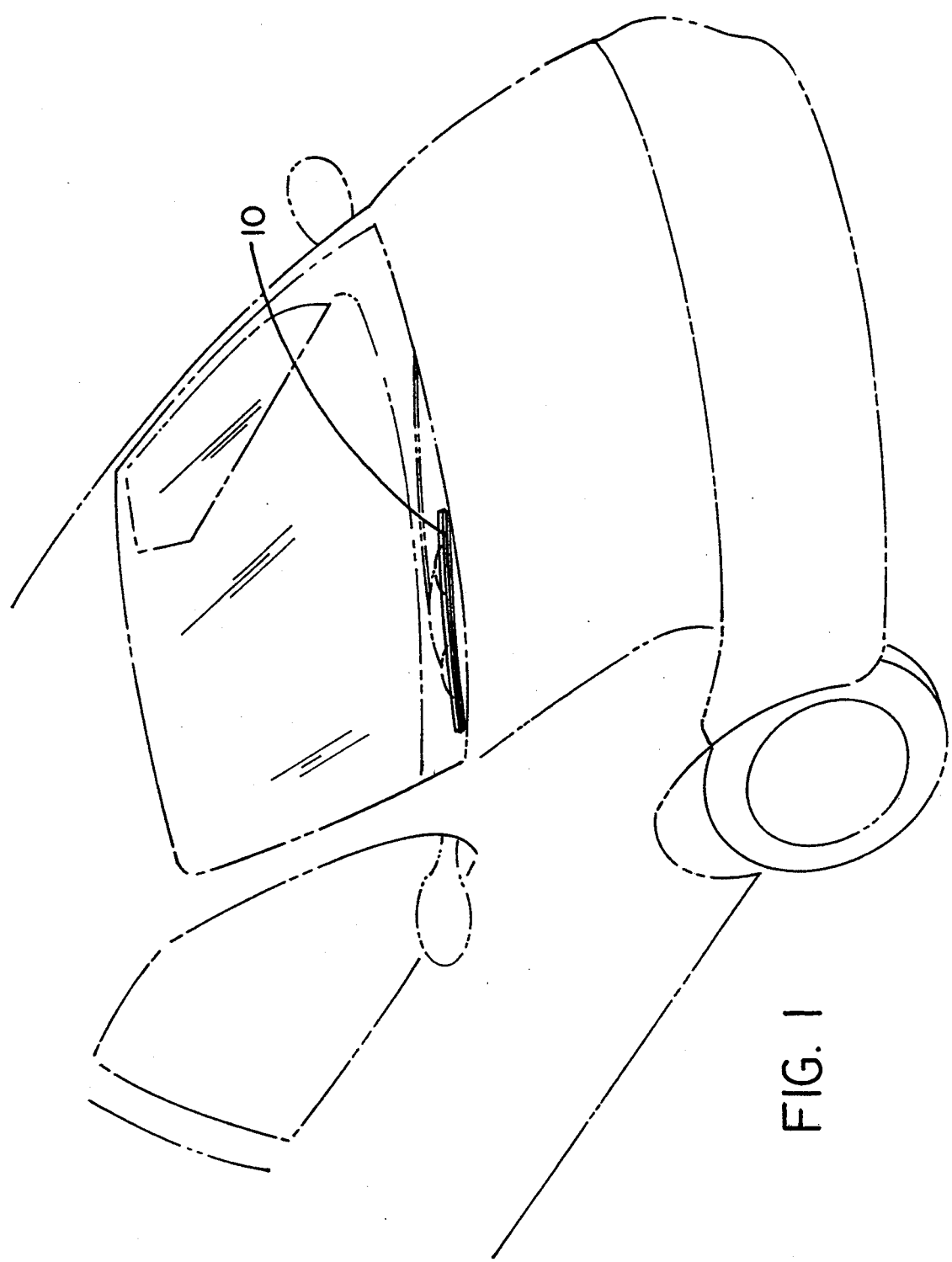
FIG. 1 is a perspective view of the preferred embodiment of the windshield wiper blade system constructed in accordance with the principles of the present invention.
Figure 2:
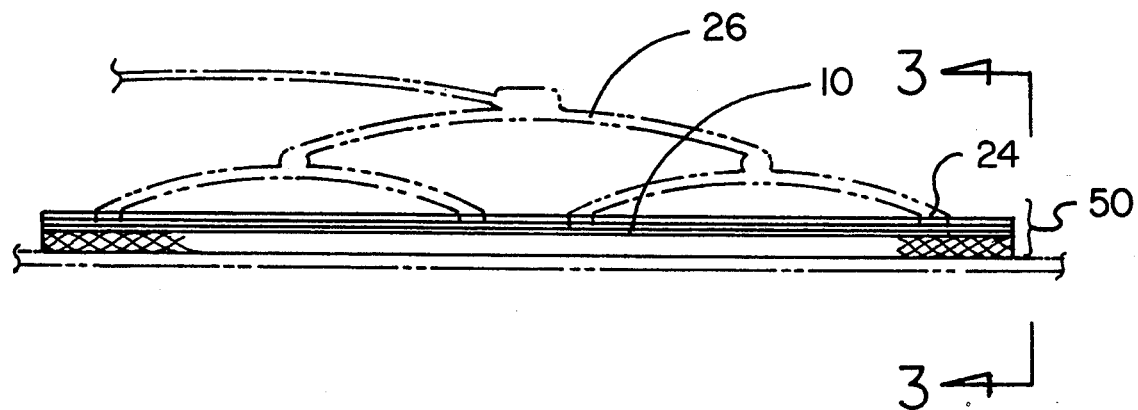
FIG. 2 is a side elevational view of the present invention.
Figure 3:
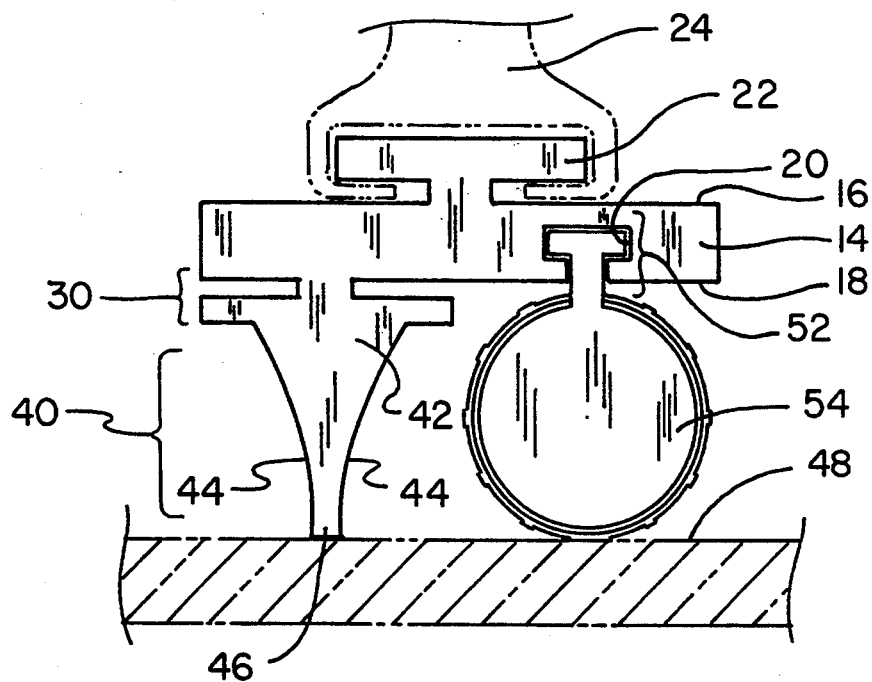
FIG. 3 is a cross sectional view along the axial extent of the system taken along the line 3—3 of FIG. 2.
Figure 4:
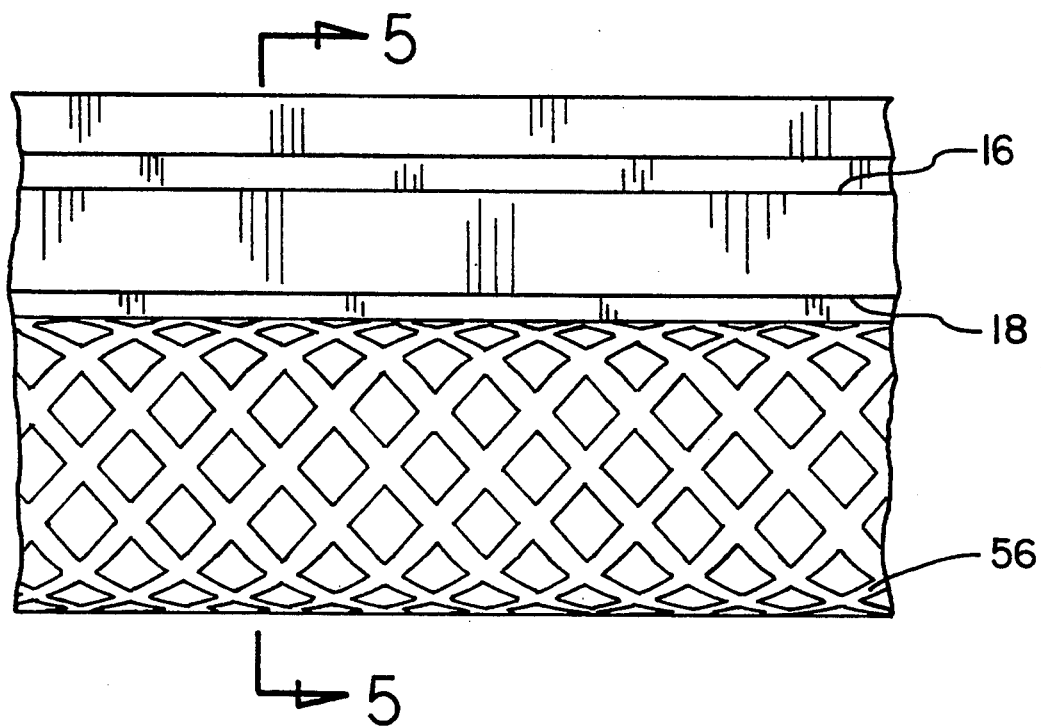
FIG. 4 is an enlarged view of the surface of the scrubbing blade and the coupling between the scrubbing blade and base portion of the wiper blade.
Figure 5:
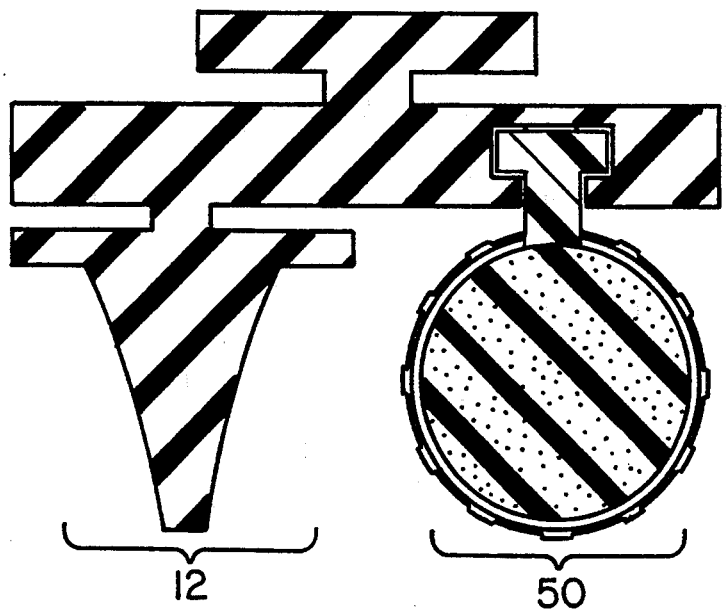
FIG. 5 is a cross sectional view of the present invention taken along the line 5—5 of FIG. 4.

With reference now to the drawings, and in particular, to FIG. 1 thereof, the preferred embodiment of the new and improved windshield wiper blade system embodying the principles and concepts of the present invention and generally designated by the reference number 10 will be described.

Specifically, the present invention includes 2 major components. The major components are the wiper blade and the scrubbing blade. These components are interrelated to provide the intended function.

More specifically, it will be noted in the various Figures that the first major component is the wiper blade 12. The wiper blade includes 4 subcomponents. The subcomponents are the base portion, the mounting flange, the support flange, and the squeegee. These subcomponents are interrelated to provide the intended function.

The first subcomponent of the wiper blade is the base portion 14. The base portion is elongated and flexible in structure. It has a top surface 16 and a bottom surface 18. The bottom surface has an upwardly extended and T-shaped channel 20 formed thereon. The channel is adapted to hold a scrubbing blade therein.

The second subcomponent of the wiper blade is the mounting flange 22. The mounting flange is flexible and T-shaped in structure. It is upwardly extended from the top surface 16 of the base portion. The upper extent of the flange is adapted to be coupled within a plurality of clip guides 24 on a vehicle's windshield wiper actuating arm 26. The mounting flange transfers the stroking motion from the actuating arm to the base portion.

The third subcomponent of the wiper blade is the support flange 30. The support flange is elongated, flexible, and T-shaped in structure. The support flange is coupled to the bottom surface 16 of the base portion and extended downwards therefrom at a location offset from the axial extent of the base portion. The support flange is adapted to hold a flexible element for stroking the windshield of a vehicle.

The fourth subcomponent of the wiper blade is the squeegee 40. The squeegee is elongated and flexible in structure. The squeegee has a base end 42 coupled to the support flange 30. It has a flexible intermediate portion extended downwards from the base end. The intermediate portion has opposed concave surfaces 44 formed thereon and tapered downwards to terminate at a tip end 46. The concave surfaces are adapted for pushing water and other loose debris from the surface of a windshield. The tip end is adapted to contact the surface of a windshield 48 and hold the squeegee in contact therewith.

The second major component of the wiper blade is the scrubbing blade 50. The scrubbing blade includes 3 subcomponents. The subcomponents are the support flange, the sponge, and the webbing. These components are interrelated to provide the intended function.

The first subcomponent of the scrubbing blade is the support flange 52. The support flange is comprised of elastomeric materials and is T-shaped in structure. The support flange has one end projected upwards and coupled within the channel 20 of the base portion. Another part of the support flange is extended therefrom and adapted to be coupled with an elongated scrubbing element.

The second subcomponent of the scrubbing blade is the sponge 54. The sponge is cylindrical in structure. It is coupled along the extended part of the support flange 52. The sponge has a surface adapted to conform with the surface of a windshield 48.

The third subcomponent of the scrubbing blade is the webbing 56. The webbing is composed of nylon. It is disposed about the cylindrical sponge. The webbing defines a scrubbing surface 58 around the cylindrical sponge. This scrubbing surface is adapted to remove hardened debris such as insects from the surface of a windshield.

When the system comprising the wiper blade and scrubbing blade is stroked back and forth across the surface of a windshield with the vehicle's windshield wiper activating arm, the squeegee of the wiper blade and the scrubbing surface of the scrubbing blade act in combination to remove both water and bugs. In one stroke, the scrubbing surface of the scrubbing blade dislodges hardened debris from the surface of a windshield. In another stroke, the squeegee wipes this dislodged debris from the surface of a windshield.

The present invention offers drivers a new type of windshield wiper that cleans bugs from windshields much more effectively than conventional wipers. This product is based on the simple observation that, although regular wipers are ineffective against bugs, wiping them manually with a rag or sponge gets them off in no time. The present invention duplicates these results by incorporating a sponge into the design of the windshield wiper itself.

The sponge is covered with nylon netting in the preferred embodiment. The sponge is mounted on the same support as the wiper but could have its own spring loaded actuating arm like that of double windshield wiper systems. In the preferred embodiment, the sponge is positioned on the lower side of the windshield wiper. In this position, cleaning action is performed by the sponge on the upward stroke of the vehicle's windshield wiper actuating arm and wiping action is performed on the downward stroke of the vehicle's windshield wiper actuating arm. With the present invention, a cleaner windshield is attained in less time than prior art embodiments. Therefore, the present invention would not have to be utilized as often as conventional windshield wiping device, thus making them last longer. The present invention can be made for trucks, cars, and other types of vehicles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A windshield wiper blade system for cleaning bugs from a windshield of a vehicle comprising, in combination:

an elongated elastomeric wiper blade including:

an elongated base portion having a top horizontal surface and a bottom horizontal surface with a central, vertical plane passing therethrough, the bottom surface having an upwardly extending T-shaped channel formed therein;

a flexible and upwardly extended T-shaped mounting flange coupled to the top surface of the base portion with an upper extent of the mounting flange adapted to be coupled within a plurality of clip guides on a vehicle's windshield wiper actuating arm;

a flexible and downwardly extended T-shaped support flange coupled to the bottom surface of the base portion, the support flange being elongated and having a longitudinal central axis parallel with but laterally offset on a first side of the base plane; and a squeegee having a base end integrally coupled to the support flange and a flexible intermediate portion having opposed concave surfaces formed thereon and tapered downwards to terminate at a tip end adapted to contact the surface of a windshield; and a scrubbing blade including:

an elastomeric and upwardly extended T-shaped enlargement having an upper part removably coupled within the channel of the base portion and a lower part extended downwardly therefrom;

an elongated cylindrical sponge having a longitudinal central axis parallel with the axis of the support flange and parallel with but offset on a second side of the base plane and coupled to the lower part of the enlargement with the sponge having a lower surface adapted to conform with the surface of a windshield; and nylon webbing disposed about the cylindrical sponge and defining a scrubbing surface therearound whereby when the system is stroked back and forth across the surface of a windshield with the vehicle's windshield wiper actuating arm, the wiper blade and the scrubbing blade remove both water and bugs.

* * * * *